United States Patent Office 2,827,348
Patented Mar. 18, 1958

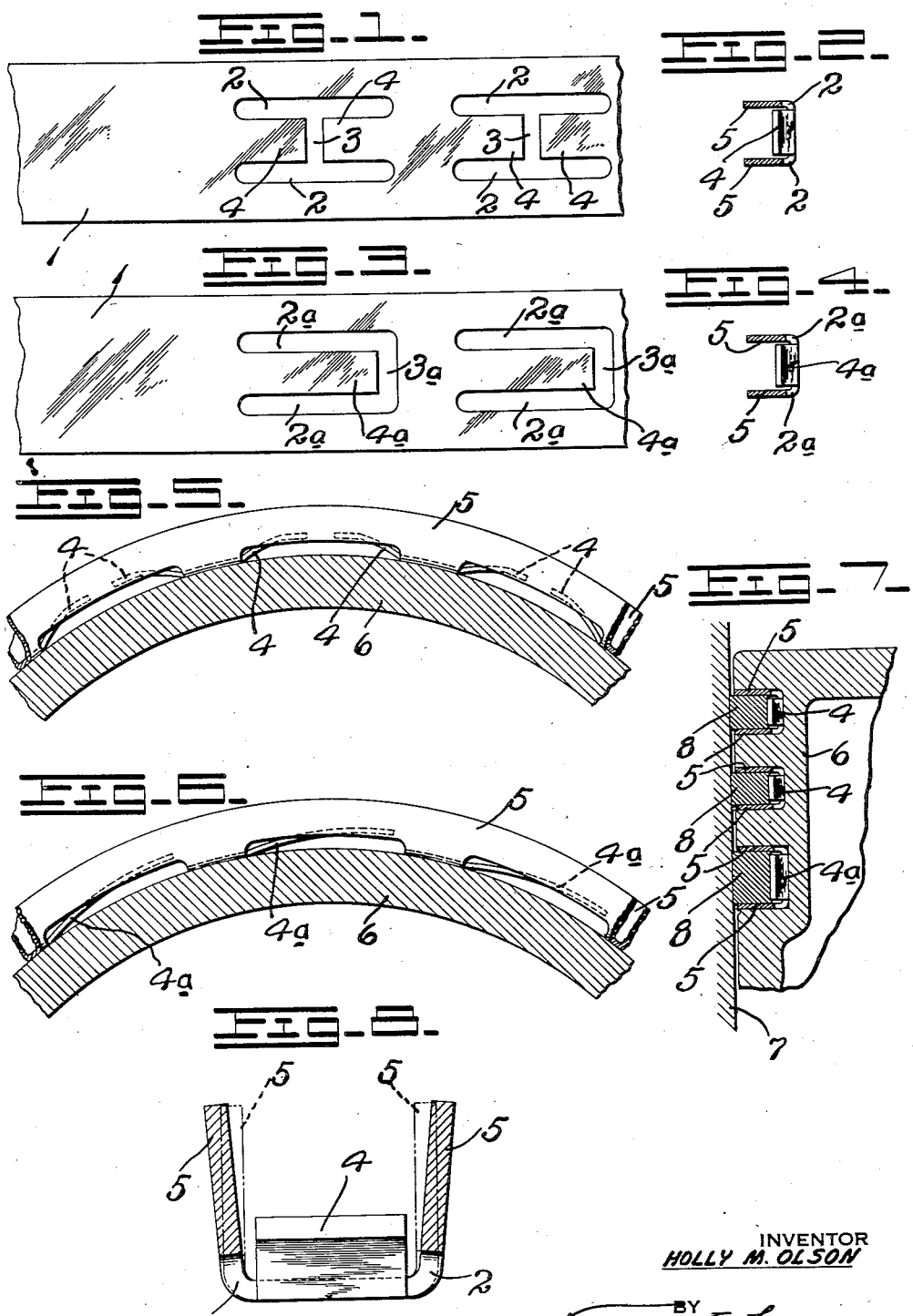

2,827,348

PISTON SUPPORT AND RING GROOVE ADAPTER

Holly M. Olson, Muskegon, Mich., assignor to Sealed Power Corporation, Muskegon, Mich., a corporation of Michigan Application August 23, 1954, Serial No. 451,337

5 Claims. (Cl. 309—24)

This invention relates to a simple, novel and particularly effective piston support and ring groove adapter which is installed in selected piston ring grooves around the head of the piston, or in all of such grooves, and in use protects the piston from battering or other upset of the metal at the sides of the piston ring grooves and, more important, holds the piston rings associated therewith squarely against the inner walls of the piston, serving to maintain the outer curved sides of piston rings where they engage against such cylinder walls against tilting and, further, maintains the piston against the tilting action to which it is subjected by reason of the varying angular positions of a crankshaft to the longitudinal axis of a piston in the reciprocation of the piston lengthwise of the cylinder.

Internal combustion engines in large numbers are now of the V-type, that is, with banks of cylinders at opposite sides of the vertical plane of the axis of the crankshaft in an internal combustion engine, disposed with their longitudinal axes in planes inclined to the vertical. Such V-type engines coming very much into use and constantly more and more being used, have resulted in a design of engine which has shorter connecting rods and in pistons which are of shorter length. This increases the lack of stability of the piston because of its short skirt below the head of the piston where the piston rings are installed. The exterior diameter of the head of the piston is less than the exterior diameter of the cylinder and the piston rings only bear against the cylinder wall above the piston skirt. On the compression stroke a piston is subjected to great pressure forces which are carried by the wrist pin of the piston, and with the changing angular position of the connecting rod and with increasingly greater angles at the extreme of such connecting rod positions, the piston is subjected to a tilting action as the connecting rod, affected by the pressure induced friction of the piston upon its wrist pin, swings transversely of the cylinder bore. Such tilting action wears the piston on its skirt below the head of the piston greatly increasing wear on opposite sides of the piston skirt, whereby the tilting of the piston is increased. Such tilting action of the piston furthermore affects the piston rings, which are tilted with respect to or carried away from square cylinder wall contact over their outer bearing surfaces, with a resultant increase in lubricating oil consumption due to oil pumping and blow-by. Attempts to cure this effect have been made by using expanders in the bottoms of piston ring grooves and at the inner curved sides of the piston rings, it being theorized that added tension is imparted to the rings.

With my invention the piston ring is maintained against a tilting action which breaks in whole or in part the effective bearing contact of the wearing face of the ring against the cylinder, the piston thus being supported, not only by its depending skirt, but the piston rings with the use of my invention being pressed securely against a cylinder wall so that in effect the piston rings at their outer bearing surfaces form an upper maintenance of the upper end of the piston against tilting action. Such tilting action of the piston is eliminated in whole or in part with a resultant improvement in operation of the internal combustion engine, less wear on the cylinder walls and also on the piston skirt, and with the seal of the bearing surfaces of the piston rings against the cylinder wall better maintained, resulting in a conserving of lubricating oil and a prevention of blow-by from the engine combustion chambers downward past the piston.

It is an object of this invention to provide a simple, useful and effective piston support and ring groove adapter which will not only maintain a piston ring in a plane substantially at right angles to the longitudinal axis of the piston on which used, but will lessen and in great measure cure the undesired tilting action of the piston and at the same time prevent damage to the sides of a piston ring groove which, with the majority of pistons made of an aluminum alloy or composition, softer than the material used in piston rings, is particularly susceptible to such battering and widening of the ring grooves.

My invention also has for its object and purpose the substantial enclosing of the piston rings by a cage or housing which will expose the piston rings only at their outer curved wearing surfaces where they engage the cylinder walls. Such cage or substantial housing for a piston ring is readily and economically manufactured from thin ribbon stock, receives a piston ring therewithin, and is snugly assembled in a ring groove and very securely and frictionally held therein with a prevention of groove wear. There is also greater heat dissipation obtained. It may be used in conjunction with all of the piston rings used on a piston, the compression ring located near the top or head end of the piston, any intermediate piston rings or any lower position oil ventilating rings, such cage or housing having ample oil passage openings for return to the engine crackcase through passages made from the bottom of the oil control ring grooves to the interior of the piston.

An understanding of the invention and preferred embodiments thereof may be had from the following description, taken in connection with the accompanying drawing, in which, Fig. 1 is a fragmentary plan view of a length of ribbon metallic material which has spaced H-slots cut therethrough, one after the other, in the first steps of manufacture.

Fig. 2 is a cross sectional view through the piston support and ring groove adapter which is made from such processed strip of material by turning flanges at opposite edge portions therefrom in the same direction to provide a circular member of channel form, with tongues pressed outwardly between said channels, said tongues being provided at opposite sides of the cross slot of each H-slot which is cut.

Fig. 3 is a view similar to Fig. 1, showing a modified form of structure with successive U-slots.

Fig. 4 is a cross section similar to Fig. 2 of the completed piston support and ring adapter, having the same flanges, and tongues provided by the U-slots shaped and formed to extend outwardly at free end portions.

Fig. 5 is a fragmentary plan view of the piston support and ring groove adapter of my invention, as shown in Fig. 2, with its inner web portion against the bottom of a piston ring groove.

Fig. 6 is a fragmentary plan view and section similar to Fig. 5 showing the piston support and ring groove adapter of the second type illustrated in Fig. 4.

Fig. 7 is a fragmentary vertical section through the upper end of a piston supplied at its ring grooves with piston rings using my invention as operatively used within an engine cylinder, and Fig. 8 is an enlarged transverse vertical section through the piston support and ring groove adapter of my invention, showing the flanges of the cross sectional channel form thereof diverging outwardly toward their free edge portions whereby when inserted in a piston ring groove, said flanges are strained inwardly toward each other in parallelism as indicated in dashed lines.

Like reference characters refer to like parts in the different figures of the drawing.

This metallic ribbon stock, as indicated at 1, usually of a spring material such as spring steel, is fed through a punch press or the like and consecutive H-slots cut therein spaced at adjacent ends from each other. Such H-slots have slots at 2 parallel to the length of the ribbon 1 forming sides, and a transverse slot 3 connecting the slots 2 to provide the H-form. This provides at each side of the transverse slot 3 tongues 4 each integrally connected at one end and free at the other end.

In Fig. 3, the slots are of U-form having two spaced longitudinal sides or legs 2a connected at one end by a transverse connecting slot 3a, a single tongue 4a being connected at one end to the stock material and the other end free.

With both forms flanges 5 are bent on bending lines which are substantially the center lines of the slots 2 or 2a. Such flanges bent in the same direction, as shown in Figs. 2 and 4, with the web connecting portions between them provide channel forms which are shaped into a circular outline. The tongues 4 and 4a of spring material are pressed outwardly so that their free end portions are a distance from the web portions connecting the flanges, providing spring cushioning pads for a piston ring inserted between the flanges 5 to bring its inner curved side against such tongues.

In practice it is preferred that the flanges 5 shall not lie at right angles to the plane of the connecting web but shall diverge outwardly toward their free edge portions as shown in full lines in Fig. 8. Thus when the piston supports and ring groove adapters are inserted in the grooves at an upper end or head of a piston 6 (Fig. 7) the flanges 5 are forced inwardly toward each other to press snugly against the opposite sides of a piston ring groove in which located, and frictionally engage thereagainst.

Internal combustion engine pistons reciprocate in cylinders, a wall of which is fragmentarily shown in Fig. 7. The outer curved bearing surfaces of the piston rings 8 shown in Fig. 7 are pressed against the cylinder wall, the tongues 4 or 4a being strained and moved at their free end portions inwardly generating forces which hold the piston rings snugly and squarely against the cylinder wall 7. The opposed flat sides of the piston rings are guided between the flanges 5 which being of a material resistant to battering or upsetting protect the upper and lower sides of the piston ring grooves.

While in Fig. 7 all of the rings 8 are shown as of the compression type, inasmuch as in a lower ring groove or in some cases more than one of the ring grooves, the piston ring used is an oil salvaging ring instead of a compression ring, any suitable conventional structure of oil passing or venting ring may be used. The openings left by cutting either the H- or U-slots provide ample passage for oil which is scraped from the cylinder walls, passing through the vented piston rings and thence through from the bottom of the piston ring groove to the interior of the piston, passages being long used for such oil drainage of the piston ring grooves.

All piston rings are parted at one side so as to pass over the head of a piston to the ring grooves therein and the piston support and ring groove adapters of my invention are similarly parted for the same purpose.

The structure described is practical and useful. Tilting or "whip" of the piston is greatly decreased if not entirely eliminated with resultant advantages as stated. There is an improved performance, quieter and smoother operation, economy of both oil and gas, the operating life is increased, heat is more readily dissipated. It is economical to manufacture and its one-piece construction facilitates and simplifies assembly of the parts. Moreover, complicated multi-piece and high tension piston rings are rendered unnecessary.

The invention is defined in the appended claims and is to be considered comprehensive of all forms of structure coming within their scope.

I claim:

1. In combination with a piston having a piston ring groove therein, a circular channel of thin metal inserted in said piston ring groove having spaced outwardly extending flanges lying against opposed sides of said groove and a web integrally connecting said flanges at their inner edges bearing against the bottom of said groove, said web having spring tongues in spaced succession in the length of said web each connected with the web at one end portion and having free end portions located outwardly from said web and a piston ring, located between said flanges, bearing and pressing inwardly against said tongues.

2. In combination with a piston having a piston ring groove therein, a parted circular channel of thin metal inserted in said groove having generally parallel spaced flanges and a web integral with said flanges connecting the same at their inner edges, said web being seated against the bottom of said groove and a plurality of tongues spaced in succession around said channel located between the inner portions of said flanges integrally connected each at one end with said web, and each having a resistingly resilient free end portion, spaced outwardly from said web and inwardly from the outer edges of said flanges.

3. In combination with a piston having spaced piston ring grooves therein, a parted circular channel of thin metal having generally parallel spaced flanges between which a piston ring is adapted to be inserted in said channel and a web integrally connecting said flanges at their inner edges located in each of said grooves with the webs thereof against the bottom of said grooves, and a plurality of spaced spring tongues in the length of each web, each permanently secured at one end to said web and each having a free end portion located outwardly from said web between said flanges, the free end portion of each tongue extending toward the connected end of the next adjacent succeeding tongue.

4. In combination with a piston having a piston ring groove therein, a circular channel of thin metal having spaced flanges and a web connecting said flanges at their inner edges, said web seating against the bottom of said groove and said flanges diverging from said web to the free edges thereof and yieldingly pressing against the sides of said groove, a plurality of yieldingly resistant tongues spaced from each other lengthwise of said web, each having one end permanently connected to the web, and each having a free end portion spaced outwardly from the web and located between said flanges, and a piston ring between said flanges, lying against the free end portions of said tongues.

5. In combination, a piston having annular ring grooves, a piston ring in each groove, a circular carrier for each piston ring in each of which a piston ring is received, said carriers bearing against the bottom of said grooves and yieldingly resisting means connected with each carrier against which its associated piston ring presses at its inner curved side, whereby when the piston is installed in an engine cylinder, said selected piston rings are pressed against the cylinder wall and maintained generally squarely thereagainst at its outer curved surface.

References Cited in the file of this patent

UNITED STATES PATENTS

| | | |
|---|---|---|
| 2,274,805 | Phillips | Mar. 3, 1942 |
| 2,290,499 | Smith | July 21, 1942 |
| 2,589,154 | Smith | Mar. 11, 1952 |
| 2,695,639 | Anderson et al. | Nov. 17, 1953 |